United States Patent
Cornell et al.

(10) Patent No.: US 6,938,948 B1
(45) Date of Patent: Sep. 6, 2005

(54) ENERGY ABSORBING FRONT FRAME STRUCTURE FOR A VEHICLE

(75) Inventors: Troy M Cornell, Grand Blanc, MI (US); Gerald F Burke, Livonia, MI (US); Harry Gu, Novi, MI (US); Pratap Naick, Lake Orion, MI (US); Mark Kirschmann, Clarkston, MI (US); Gregory A Beecher, Madison Heights, MI (US); Harjeet Gill, Sterling Heights, MI (US); Erin Shipp, Rochester Hills, MI (US); Kenneth J Haller, Davisburg, MI (US); Michael Okuniewicz, Rochester Hills, MI (US); Manfred Staisch, Lake Orion, MI (US); Dave Cottrell, Waterford, MI (US); Larry Ososki, Warren, MI (US); Norman Hartmann, Macomb, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/789,884

(22) Filed: Feb. 27, 2004

(51) Int. Cl.[7] .............................................. B60R 27/00
(52) U.S. Cl. ........................ 296/187.09; 296/193.09; 296/203.02
(58) Field of Search ...................... 296/187.09, 193.09, 296/203.02

(56) References Cited

U.S. PATENT DOCUMENTS

| | | |
|---|---|---|
| 5,244,248 A | 9/1993 | Bovellan |
| 5,611,568 A | 3/1997 | Masuda |
| 5,806,918 A | 9/1998 | Kanazawa |
| 5,884,963 A | 3/1999 | Esposito et al. |
| 5,906,248 A | 5/1999 | Nagaike et al. |
| 6,056,337 A | 5/2000 | Oguri et al. |
| 6,099,039 A | 8/2000 | Hine |
| 6,099,071 A | 8/2000 | Kasuga et al. |
| 6,193,274 B1 | 2/2001 | Brown et al. |
| 6,209,948 B1 | 4/2001 | Mori et al. |
| 6,422,604 B2 | 7/2002 | Lapic |
| 6,574,540 B2 | 6/2003 | Yokota et al. |
| 2004/0195862 A1 * | 10/2004 | Saeki ................... 296/187.09 |
| 2004/0200659 A1 * | 10/2004 | Miyasaka .............. 296/193.09 |

* cited by examiner

Primary Examiner—Lori L. Coletta
(74) Attorney, Agent, or Firm—Ralph E. Smith (57) ABSTRACT

A method and apparatus for absorbing energy during a frontal collision of a vehicle, through the use of a front frame structure having main frame rails that include several deformable and non-deformable sections which are connected by selectively crushable junctures that are configured to predispose one or more of the junctures and sections to pivot selectively outward, rearward and upward, in a predetermined manner, during the collision. The front frame structure also includes an engine cradle, attached below the main frame rails, and having a pair of side rails that include forward and rear crushable junctures joined by non-deformable intermediate sections, with the crushable junctures of the main frame rails and engine cradle side rails being configured to predispose the intermediate sections of the engine cradle side rails to move downward and rearward during the collision.

20 Claims, 6 Drawing Sheets

ENERGY ABSORBING FRONT FRAME STRUCTURE FOR A VEHICLE

TECHNICAL FIELD OF THE INVENTION

This invention relates to chassis structures for motor vehicles, and more particularly to absorbing energy in a front frame structure of such a chassis during a frontal collision of the vehicle.

BACKGROUND OF THE INVENTION

It is generally known that it is advantageous to configure a motor vehicle such that a forward section of the vehicle will be predisposed to deform in a predetermined manner during a frontal collision, to thereby provide protection to occupants of the vehicle. Various governmental and industry organizations, such as the National Highway Safety and Transportation Authority (NHTSA) and the Insurance Institute for Highway Safety (IIHS) have promulgated standardized testing procedures, standards, and rating systems relating to the performance of vehicles during frontal collisions.

There are several aspects to providing acceptable protection of the occupants. It is desirable to cause the components of the forward part of the vehicle to deform in such a way that they do not penetrate the passenger compartment of the vehicle. It is also desirable to cause the components to deform in such a way that the change in momentum of the vehicle, caused by the frontal collision, is absorbed into the front frame structure during the collision over period of time that is long enough for supplemental restraint systems, such as air bags, to be deployed, and so that G-loads on occupants of the vehicle can be held within acceptable limits.

In order to achieve these objectives, in prior art vehicles, the forward end of the vehicle would be compressed 22–27 inches in a time period of about six hundredths (0.06) of a second. The amount and duration of compression that can be accomplished for a given vehicle are limited, of course, by the size and shape of the vehicle, and in particular by the percentage that the length of the portion of the vehicle extending forward from the passenger compartment can be compressed during the collision.

It is desirable to provide an improved front frame structure and method for absorbing energy during a frontal collision of the vehicle, that enhances occupant protection by increasing the percentage of length that the forward end of the vehicle can be compressed, and by lengthening the duration of the compression.

SUMMARY OF THE INVENTION

The invention provides an improved method and apparatus for absorbing energy during a frontal collision of a vehicle, through the use of an improved front frame structure having main frame rails that include several deformable and non-deformable sections connected by selectively crushable junctures that are configured to predispose one or more of the junctures to pivot selectively outward, rearward and upward, in a predetermined manner, during the collision.

The front frame structure may also include an engine cradle, attached below the main frame rails, and having a pair of side rails that include forward and rear crushable junctures joined by non-deformable intermediate sections. The crushable junctures of the main frame rails and the engine cradle side rails are configured to predispose the intermediate sections of the engine cradle side rails to move downward and rearward during the collision.

The main frame rails of the front frame structure may further include a deformable front section that absorbs additional energy during the collision by collapsing in a predetermined advantageous manner.

The combined actions of the various sections and selectively crushable junctures of the front frame structure of the invention allow for a higher percentage of the length of the portion of the vehicle extending forward from the passenger compartment to be compressed, during a frontal collision, than is achievable with prior energy-absorbing front frame structures. Depending upon the vehicle, a front frame according to the invention can add 5 to 10 inches of additional compressible length, as compared to the same vehicle using prior energy absorbing front frame structures. The various sections and selectively crushable junctures of the front frame structure of the invention are also predisposed to move, during the collision, in directions and to locations that provide additional protection to occupants of the vehicle. The duration of energy absorption is also increased, thereby allowing more time for supplemental restraint systems to be deployed, and lowering G-forces exerted on the occupants, during the collision. Depending upon the vehicle, a front frame structure according to the invention can increase the duration of compression by as much as fifty percent, as compared to the same vehicle using a prior energy absorbing front frame structure.

In one form of the invention, a front frame structure, for absorbing energy during a frontal collision of a vehicle, includes a bumper reinforcement, a pair of main frame rails, and an engine cradle. The bumper reinforcement is disposed at a front end of the frame structure and extends transversely to a longitudinal centerline of the vehicle. The pair of main frame rails are juxtaposed and extend longitudinally along the longitudinal centerline of the vehicle, with each main frame rail having a front end thereof attached to the bumper reinforcement and a rear end thereof attached to side rails of the vehicle. The engine cradle is disposed below the main frame rails, and includes a pair of longitudinally extending side rails.

Each main frame rail has a deformable forward section, a non-deformable intermediate section and a non-deformable rear section thereof, with each of the forward, intermediate and rear sections of each main frame rail defining a front and a rear end thereof. The forward section of each main frame rail is joined at the front end thereof to the bumper reinforcement, and joined at the rear end thereof to the front end of the intermediate section. The rear section of each main frame rail is joined at the front end thereof to the rear end of the intermediate section, and joined at the rear end thereof to the side rails of the vehicle.

Each main frame rail further includes a first selectively crushable juncture joining the rear end of the forward section to the front end of the intermediate section, a second selectively crushable juncture joining the rear end of the intermediate section to the front end of the rear section, and a third selectively crushable juncture between the rear end of the rear section and the side rails of the vehicle. One or more of the first, second, and third selectively crushable junctures predisposes at least one of the second selectively crushable junctures to pivot outward with respect to the longitudinal centerline during a frontal collision of the vehicle.

Each of the engine cradle side rails is attached at a front end thereof to the forward section of the main frame rail which is disposed above that respective cradle side rail. The rear end of each engine cradle side rail is attached to the vehicle at a rear attachment point of the cradle. The rear attachment point of the cradle is disposed adjacent the rear end of the rear section of the main frame rail which is disposed above that respective cradle side rail.

One or more of the selectively crushable junctures may also predispose the front end of at least one of the rear sections of the main frame rails to pivot rearward during a frontal collision of the vehicle, and/or for at least one of the second selectively crushable junctures to pivot upward during a frontal collision of the vehicle, and/or for the front end of at least one of the rear sections to pivot rearward during a frontal collision of the vehicle.

At least one of the selectively crushable junctures of the main frame may comprise a rectangular box frame structure having one or more generally longitudinally oriented elongated stiffening ribs embossed into a wall of one surface of the rectangular box frame structure, to thereby predispose the selectively crushable juncture to bend in a preferred direction during a frontal collision of the vehicle.

At least one of the selectively crushable junctures of the engine cradle side rails may comprise a rectangular box frame structure having a bend initiating dimple extending transversely across one surface of the rectangular box frame structure and a pair of longitudinally extending slots adjacent the bend initiating dimple in one or more of the adjoining surfaces of the rectangular box frame structure.

The front frame structure may be configured so that it is predisposed to collapse in a sequential fashion, during a frontal collision, whereby the front sections of the main frame rails are predisposed to deform first, the second junctures of the main frame rails are predisposed to pivot outward and upward second, the intermediate sections of the engine cradle are predisposed to move downward third, and the front ends of the rear sections of the main frame rails are predisposed to pivot rearward last.

The invention may also take the form of a method for absorbing energy during a frontal collision of a vehicle, through the use of an improved front frame structure, according to the invention as described above and hereinafter.

The foregoing and other features and advantages of the invention will become further apparent from the following detailed description of exemplary embodiments, read in conjunction with the accompanying drawings. The detailed description and drawings are merely illustrative of the invention rather than limiting, the scope of the invention being defined by the appended claims and equivalents thereof.

Throughout the following description of the exemplary embodiment of the invention, the terms front ($F_F$), rear ($R_R$), left (L), right (R), up (U), down (D), forward, inboard and outboard, are intended to have their usual and customary meanings, as seen from the reference point of a driver seated in the vehicle and facing forward in the vehicle during a forward direction of travel of the vehicle. FIGS. 1–7 include indicators illustrating the directional conventions utilized in describing the components and aspects of the invention shown in those views.

DETAILED DESCRIPTION

Figure 1:
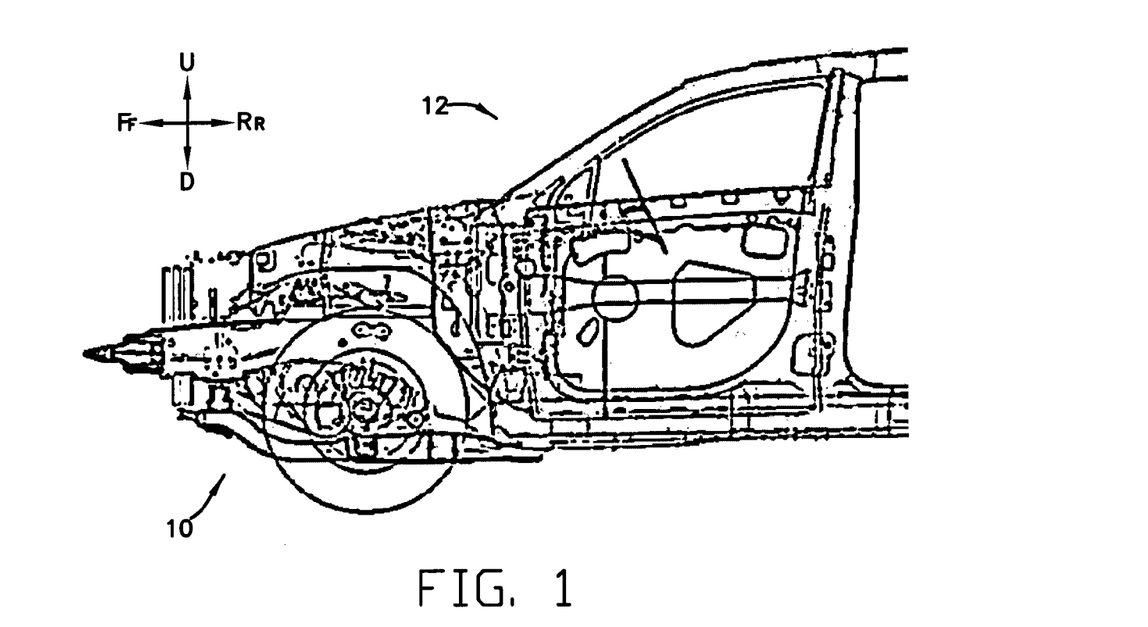
FIGS. 1 and 2 are partial schematic cross-sections of an exemplary embodiment of a vehicle having a front frame structure, according to the invention, before and after a frontal collision of the vehicle.
Figure 2:
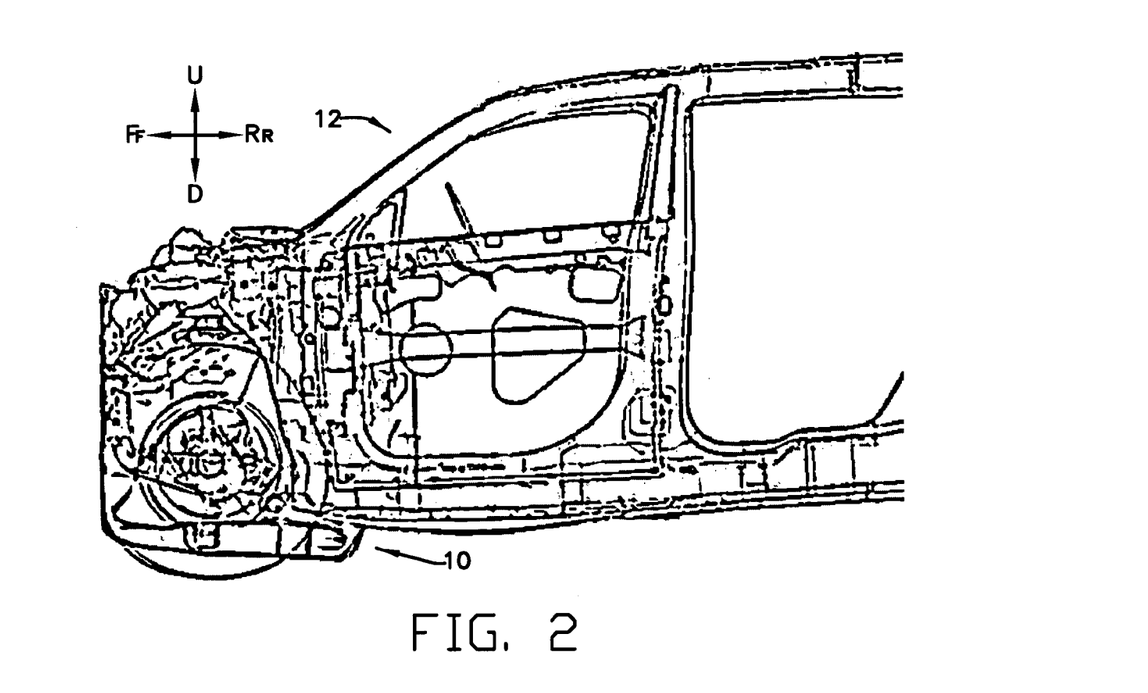

FIGS. 1–7 show an exemplary embodiment of a front frame structure 10, for absorbing energy during a frontal collision of a vehicle 12. FIGS. 1 and 2, respectively, show the vehicle 12 and the front frame structure before and after a frontal collision of the vehicle with a solid barrier extending completely across the front end of the vehicle 12 in a direction that is perpendicular to a longitudinal axis of the vehicle 12.

Figure 3:
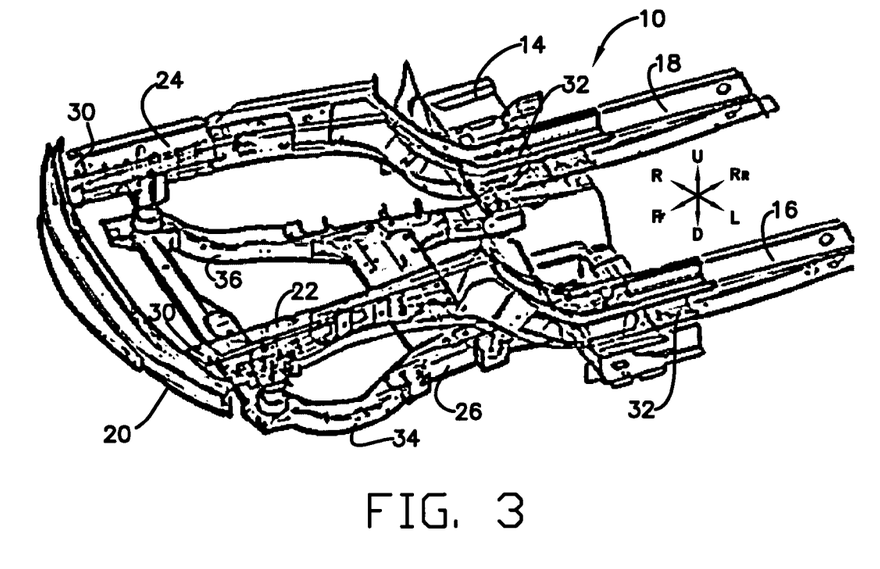
FIG. 3 is a perspective view of the front frame structure of FIGS. 1 and 2, prior to a collision.
Figure 4:
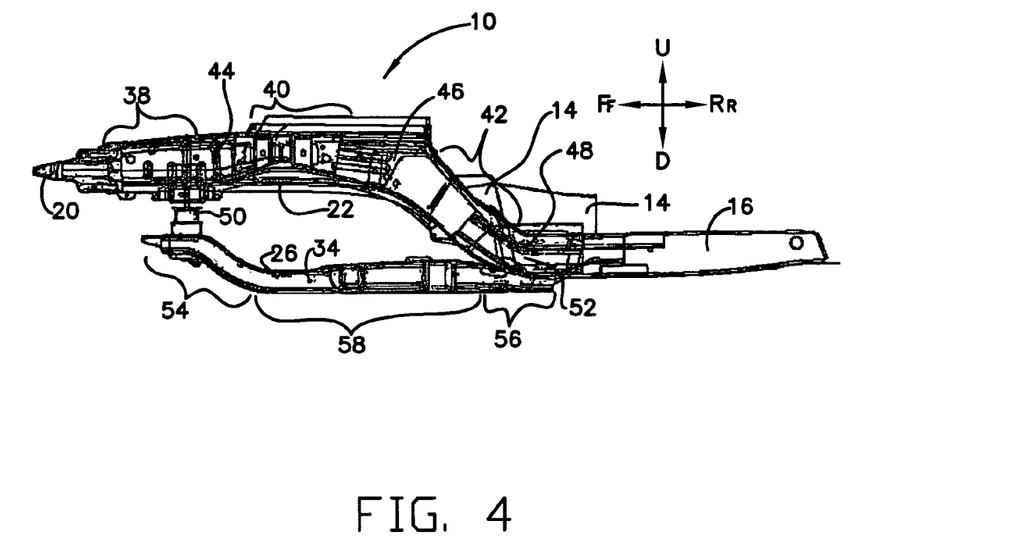
FIGS. 4 and 5 are elevation and plan views respectively of the front frame structure of FIGS. 1–3, prior to a collision.
Figure 5:
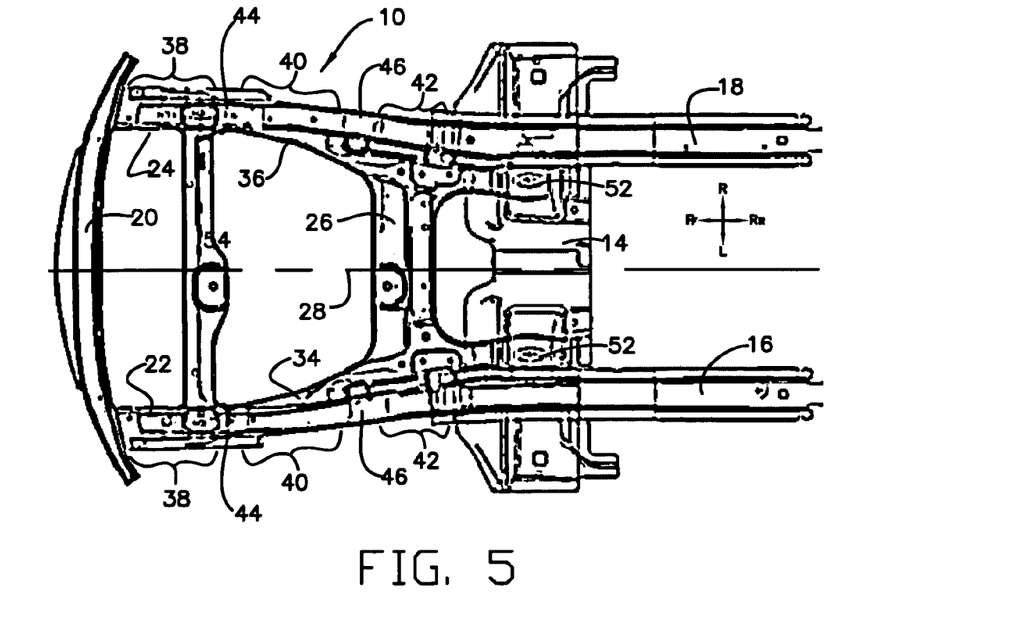
Figure 6:
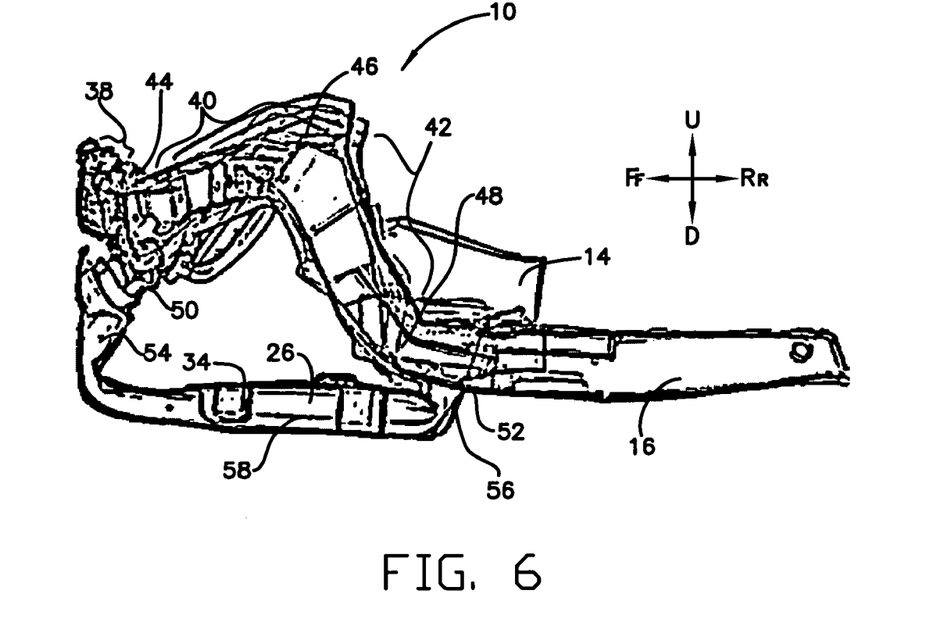
FIGS. 6 and 7 elevation and plan views respectively of the front frame structure of FIGS. 1–3, subsequent to a frontal collision.
Figure 7:
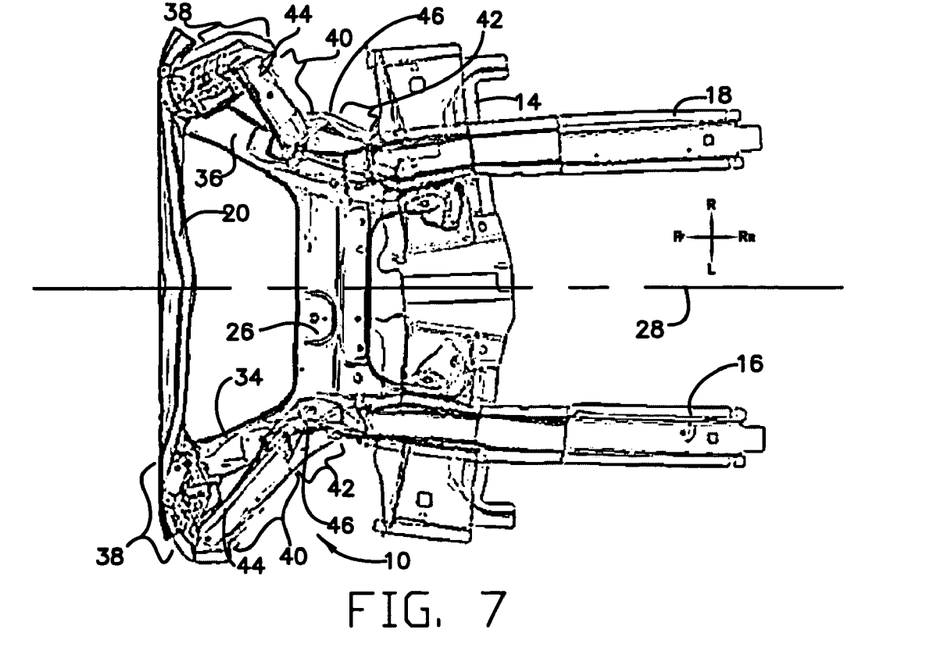

For clarity of illustration, the majority of the vehicle 12 is not shown in FIGS. 3–7. FIGS. 3–5 show the front frame structure 10 before the collision, together with only a floor pan 14, and a pair of left and right side rails 16, 18 of the remainder of the vehicle 12. FIGS. 6 and 7 show the front frame structure 10, the floor pan 14, and the side rails 16, 18 after the collision.

Because the invention includes components that are moved, deformed and/or crushed during the collision in a manner that alters their appearance and location, the reader may find it advantageous to simultaneously compare FIGS. 3–7, showing the vehicle 12 and front frame structure 10 before and after the collision, in conjunction with the following description, in order to better appreciate the various components and aspects of the invention.

As shown in FIGS. 3–5, the front frame structure 10 includes a bumper reinforcement 20, a pair of main frame rails 22, 24 and an engine cradle 26. As shown, in FIGS. 5 and 7, the bumper reinforcement 20 is disposed at a front end of the front frame structure 10 and extends transversely to a longitudinal centerline 28 of the vehicle 12. The pair of main frame rails, hereinafter alternatively identified as a left main frame rail 22 and a right main frame rail 24, are juxtaposed respectively on the left and right sides of the vehicle 12, and extend longitudinally along the longitudinal centerline 28 of the vehicle 12.

As shown in FIG. 3, each of the left and right main frame rails 22, 24 has a front end 30 thereof attached to the bumper reinforcement 20 and a rear end 32 thereof attached respectively to the left or right side rail 16, 28 of the vehicle 12. The engine cradle 26 is disposed below the main frame rails 22, 24, and includes a pair of longitudinally extending left and right side rails 34, 36.

As shown in FIGS. 4–7, each of the left and right main frame rails 22, 24 has a deformable forward section 38, a non-deformable intermediate section 40, and a non-deformable rear section 42, thereof, with each of the forward, intermediate and rear sections 38, 40, 42 of each main frame rail 22, 24 defining a front and a rear end thereof. The forward section 38 of each main frame rail 22, 24 is joined at the front end thereof to the bumper reinforcement 20, and joined at the rear end thereof to the front end of the intermediate section 40. The rear section 42 of each main frame rail 22, 24 is joined at the front end thereof to the rear end of the intermediate section 40, and joined at the rear end thereof to one of the side rails 16, 18 of the vehicle 12.

Each main frame rail 22, 24 further includes a first selectively crushable juncture 44 joining the rear end of the forward section 38 to the front end of the intermediate section 30, a second selectively crushable juncture 46 joining the rear end of the intermediate section 40 to the front end of the rear section 42, and a third selectively crushable juncture 48 between the rear end of the rear section 42 and the respective left or right side rail 16, 18 of the vehicle 12. The first, second, and third selectively crushable junctures 44, 46, 48, deform in such a manner that the second selectively crushable junctures 46 are caused to pivot outward with respect to the longitudinal centerline 28, as best seen in FIG. 7, during a frontal collision of the vehicle 12. The selectively crushable junctures 44, 46, 48 of the main frame rails also provide for the forward ends of the rear sections 42 of the main frame rails 22, 24 to pivot rearward during a frontal collision of the vehicle 12, for the second selectively crushable junctures 44 to pivot upward during a frontal collision of the vehicle 12, and for the front end of the rear sections 42 to pivot rearward during a frontal collision of the vehicle 12, as shown in FIG. 6.

As shown, in FIGS. 4 and 6, each of the engine cradle side rails 34, 36 is attached at a front end thereof, through a front resilient mount 50, to the forward section 38 of the main frame rail 22, 24 extending longitudinally above that respective cradle side rail 34, 36. The rear end of each engine cradle side rail 34, 36 is attached to the floor pan 14 of the vehicle 12 through a rear resilient mount (not shown), at a rear attachment point 52 of the cradle 26 which is disposed adjacent the rear end of the rear section 42 of the main frame rail 22, 24 disposed above that respective cradle side rail 34, 36. The front and rear ends of the engine cradle side rails 34, 36 each include a front selectively crushable juncture 54, and a rear selectively crushable juncture 56 joined by a non-deformable intermediate section 58. The front and rear selectively crushable junctures 54, 56 of the engine cradle side rails 34, 36 provide for the intermediate sections 58 of the engine cradle 26 to move downward and rearward during a frontal collision of the vehicle 12, as shown in FIGS. 2 and 6.

Through judicious design of the above described components, the front frame structure 12 may be configured so that it is predisposed to collapse in a sequential fashion, during a frontal collision, whereby the front sections 38 of the main frame rails 22, 24 are predisposed to deform first, the second junctures 46 of the main frame rails 22, 24 are predisposed to pivot outward and upward second, the intermediate sections 58 of the engine cradle 26 are predisposed to move downward third, and the front ends of the rear sections 42 of the main frame rails 22, 24 are predisposed to pivot rearward last.

It will be understood by those having skill in the art, that the terms deformable, non-deformable, and crushable, as used in relation to the component parts of the front frame structure 10, are not absolute, but somewhat relative terms with respect to one another. The crushable sections are configured in such a manner that they tend to fold or be crushed to the greatest degree during a collision. The deformable sections are somewhat more resistant to folding, bending or crushing that the crushable sections. The non-deformable sections are configured to provide the most resistance to bending, folding or crushing during the collision. Conversely, the crushable and deformable sections have some degree of non-deformability, until a threshold loading condition is encountered, and even the non-deformable sections may exhibit some deformation during a collision, depending upon the actual direction and magnitude of the frontal impact experienced by the vehicle 12 during the collision. By judicious design and placement of the crushable, deformable and non-deformable sections with regard to one another, in accordance with the invention, each section is predisposed to perform in an advantageous, predetermined manner during a frontal collision of the vehicle 12.

Figure 8:
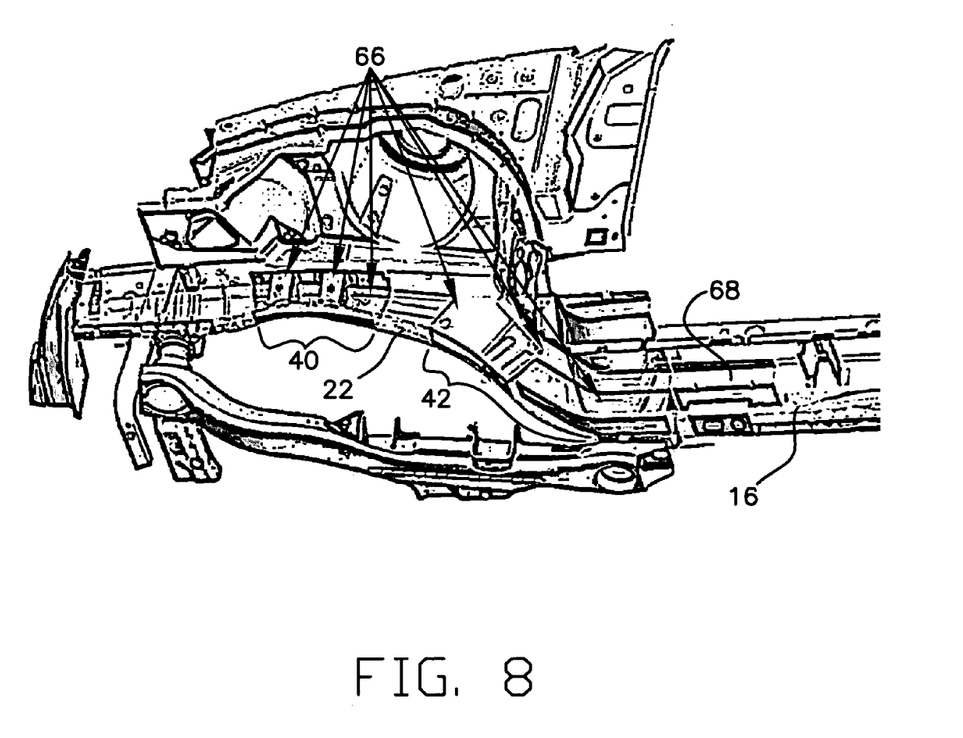
FIG. 8 is a perspective view of the outboard sides of a left main frame rail of the front frame structure, and a portion of a left side rail of the vehicle, of FIGS. 1–7, with an outer wall of the left main frame rail and the left vehicle side rail cut away to shown internal reinforcements.

The non-deformable sections 40, 42, 58 of the main frame rails 22, 24 and engine cradle 26 can be formed by any known method, such as by locally thickening the walls of the non-deformable sections 40, 42, 58 or by adding doublers or other reinforcing structures in the non-deformable sections 40, 42, 58. FIG. 8 shows a series of local doublers and reinforcements 66 in the left main frame rail 22 of the exemplary embodiment. The left side rail 16 of the exemplary embodiment also includes an internal reinforcement 68 at a point adjacent the rear end of the left front main frame rail 22.

Figure 9:
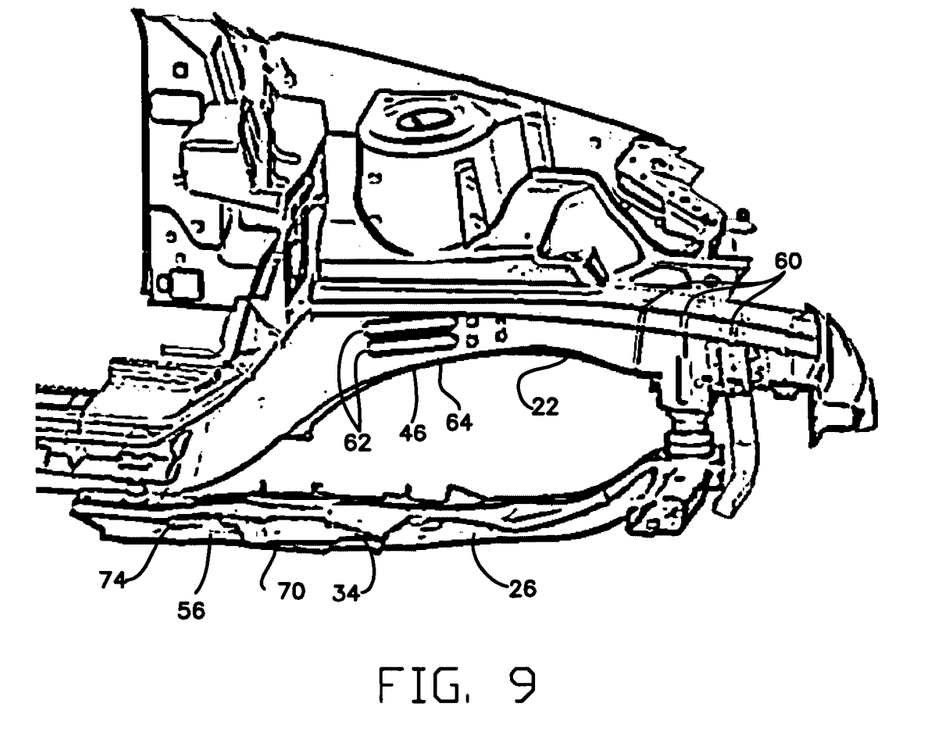
FIG. 9 is a perspective view of the inboard sides of the left main frame rail and engine cradle side rails of the front frame structure of FIGS. 1–8.

The deformable sections 38, and the selectively crushable junctures 44, 46, 48, 54, 56, of the main frame rails 22, 24 and engine cradle side rails 34, 36 may also be formed by any known manner, such as by locally thinning of the walls of the rails 22, 24, 34, 36, or by including judiciously placed crush initiating dimples, beads or bend initiators, as shown at 60 in FIG. 9.

In the exemplary embodiment of the front frame structure 10, the main frame rails 22, 24 are rectangular box frame structures. As shown, in FIG. 9, the second selectively crushable juncture 46 of the left main frame rail 22 includes a pair of generally longitudinally oriented elongated stiffening ribs 62 embossed into an inner vertical surface 64 of the otherwise generally rectangular box frame structure of the second selectively crushable juncture 46. The outer vertical surface (not shown) of the second selectively crushable juncture 46 of the left main frame rail 22 is configured as a flat wall, and does not include longitudinally oriented elongated stiffening ribs. The shape and location of the stiffening ribs 62 predispose the inner vertical surface 64 of the second selectively crushable juncture 46 to be slightly more resistant to bending than the outer surface of the second selectively crushable juncture 46, to thereby contribute to predisposing the second selectively crushable junctures 46 to pivot outward, upward and rearward, in preferred directions, during a frontal collision of the vehicle 12.

Figure 10:
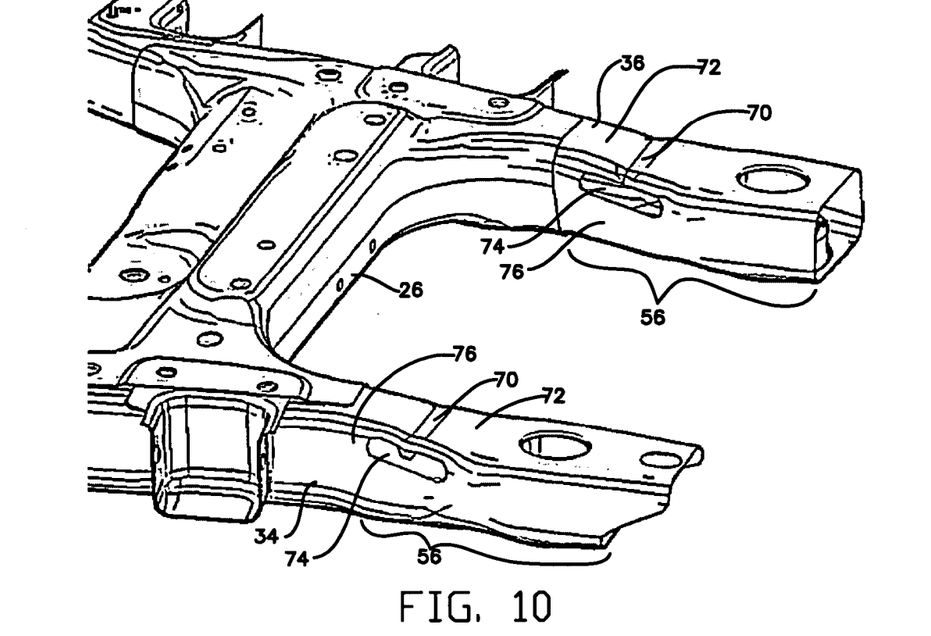
FIGS. 10 and 11 are perspective views of a rear portion of an engine cradle of the front frame structure of FIGS. 1–9, before and after a frontal collision.
Figure 11:
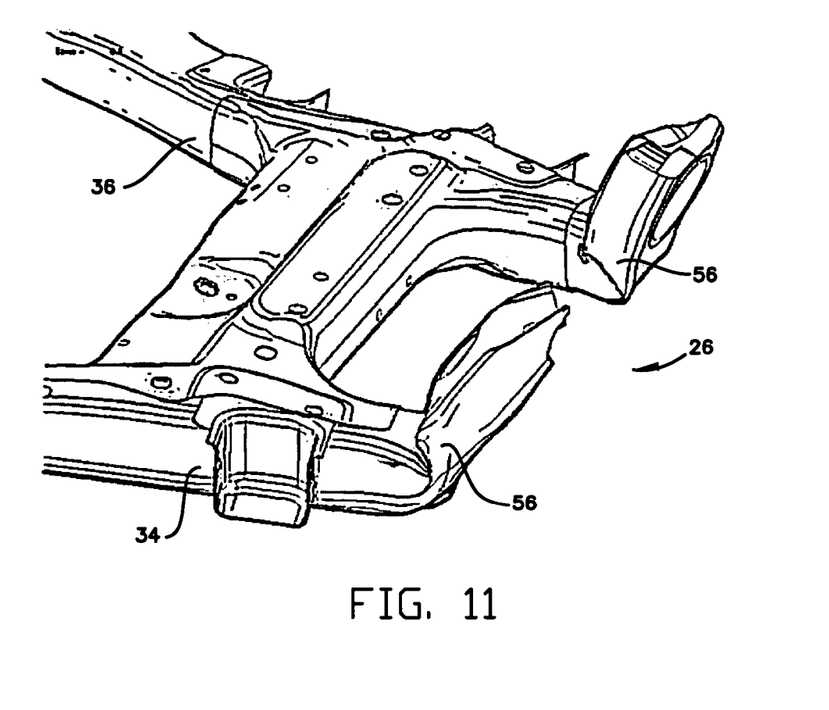

The engine cradle side rails 34, 36 of the exemplary embodiment are also configured as rectangular box frame structures. As shown, in FIGS. 9–10, the rear selectively crushable junctures 56 of the engine cradle side rails 34, 36 include a novel bend initiating configuration, having an elongated bend initiating dimple 70 extending transversely across the upper surface 72 of the rectangular box frame structure of the rear selectively crushable junctures 56, and a pair of longitudinally extending slots 74 located adjacent the bend initiating dimples 70 in the vertical sidewalls 76 adjoining the upper surfaces 72 of the rear selectively crushable junctures 56 of the engine cradle side rails 34, 36. The slots 74 extend completely through the vertical sidewalls 76. The combination of the bend initiating dimples 70 in the upper surfaces 72, with the slots 74 in the vertical walls of the rear selectively crushable junctures 56 of the engine cradle side rails 34, 36, predisposes the rear selectively crushable junctures 56 of the engine cradle side rails 34, 36 to gooseneck upward, as shown in FIG. 11, to aid in causing the intermediate sections 58 of the engine cradle 26 to move downward and rearward during a frontal collision of the vehicle 12, as shown in FIGS. 1 and 6.

Those skilled in the art will also readily recognize that, while the embodiments of the invention disclosed herein are presently considered to be preferred, various changes and modifications can be made without departing from the spirit and scope of the invention. The scope of the invention is indicated in the appended claims, and all changes or modifications within the meaning and range of equivalents are embraced therein.

We claim:

1. A front frame structure for a vehicle, attached to side rails of the vehicle, for absorbing energy during a frontal collision of the vehicle, the front frame structure comprising:
 a bumper reinforcement disposed at a front end of the frame structure and extending transversely to a longitudinal centerline of the vehicle; and
 a pair of juxtaposed main frame rails extending longitudinally along the longitudinal centerline of the vehicle, each main frame rail having a front end thereof attached to the bumper reinforcement and a rear end thereof attached to a respective side rail of the vehicle;
 each main frame rail having a deformable forward section, a non-deformable intermediate section and a non-deformable rear section thereof, each of the forward, intermediate and rear sections of each main frame rail defining a front and a rear end thereof;
 the forward section of each main frame rail being joined at the front end thereof to the bumper reinforcement and at the rear end thereof to the front end of the intermediate section of that main frame rail;
 the rear section of each main frame rail being joined at the front end thereof to the rear end of the intermediate section of that main frame rail and at the rear end thereof to the respective side rail of the vehicle;
 each main frame rail further including a first selectively crushable juncture joining the rear end of the forward section of that main frame rail to the front end of the intermediate section of that frame rail, a second selectively crushable juncture joining the rear end of the intermediate section of that frame rail to the front end of the rear section of that main frame rail, and a third selectively crushable juncture between the rear end of the rear section of that main frame rail and the respective side rail of the vehicle;
 one or more of the first, second, and third selectively crushable junctures predisposing at least one of the second selectively crushable junctures to pivot outward with respect to the longitudinal centerline during a frontal collision of the vehicle.

2. The front frame structure of claim 1 wherein at least one of the selectively crushable junctures comprises a rectangular box frame structure having one or more generally longitudinally oriented elongated stiffening ribs embossed into a wall of one surface of the rectangular box frame structure, to thereby predispose the selectively crushable juncture to bend in a preferred direction during a frontal collision of the vehicle.

3. The front frame structure of claim 1, wherein one or more of the selectively crushable junctures further predisposes the forward end of at least one of the rear sections to pivot rearward during a frontal collision of the vehicle.

4. The front frame structure of claim 1, wherein one or more of the selectively crushable junctures further predisposes at least one of the second selectively crushable junctures to pivot upward during a frontal collision of the vehicle.

5. The front frame structure of claim 4, wherein one or more of the selectively crushable junctures further predisposes the front end of at least one of the rear sections to pivot rearward during a frontal collision of the vehicle.

6. The front frame structure of claim 5 wherein, for each main frame rail, the front section is predisposed to deform first, the second juncture is predisposed to pivot outward and upward second, and the front end of the rear section is predisposed to pivot rearward last during a frontal collision of the vehicle.

7. The front frame structure of claim 6, further comprising, an engine cradle disposed below the main frame rails and having a pair of longitudinally extending side rails, each engine cradle side rail being attached at a front end thereof to the forward section of one of the main frame rails and attached at a rear end thereof to the vehicle at rear attachment point of the cradle disposed adjacent the rear end of the rear section of the one of the main frame rails.

8. The front frame structure of claim 7, wherein each of the engine cradle side rails includes a front and a rear selectively crushable juncture joined by a non-deformable intermediate section of that engine cradle side rail, the front and rear selectively crushable junctures of the engine cradle side rails predisposing the intermediate sections of the engine cradle to move downward and rearward during a frontal collision of the vehicle.

9. The front frame structure of claim 8, wherein at least one of the selectively crushable junctures of the engine cradle side rails comprises a rectangular box frame structure having a bend initiating dimple extending transversely across one surface of the rectangular box frame structure and a pair of longitudinally extending slots adjacent the bend initiating dimple in one or more of the adjoining surfaces of the rectangular box frame structure.

10. A front frame structure for a vehicle, attached to side rails of the vehicle, for absorbing energy during a frontal collision of the vehicle, the front frame structure comprising:
 a bumper reinforcement disposed at a front end of the frame structure and extending transversely to a longitudinal centerline of the vehicle;
 a pair of juxtaposed main frame rails extending longitudinally along the longitudinal centerline of the vehicle, each main frame rail having a front end thereof attached to the bumper reinforcement and a rear end thereof attached to a respective side rail of the vehicle; and
 an engine cradle disposed below the main frame rails and having a pair of longitudinally extending side rails;
 each main frame rail having a deformable forward section, a non-deformable intermediate section and a non-deformable rear section thereof, each of the forward, intermediate and rear sections of each main frame rail defining a forward and a rear end thereof;
 the forward section of each main frame rail being joined at the front end thereof to the bumper reinforcement and at the rear end thereof to the forward end of the intermediate section of that main frame rail;
 the front end of the rear section of each main frame rail being joined at the forward end thereof to the rear end of the intermediate section of that main frame rail and at the rear end thereof to the respective side rail of the vehicle;

each main frame rail further including a first selectively crushable juncture joining the rear end of the forward section of that main frame rail to the front end of the intermediate section of that main frame rail, a second selectively crushable juncture joining the rear end of the intermediate section of that main frame rail to the front end of the rear section of that main frame rail, and a third selectively crushable juncture between the rear end of the rear section of that main frame rail and the respective side rail of the vehicle;

one or more of the first, second, and third selectively crushable junctures providing for at least one of the second selectively crushable junctures to pivot outward with respect to the longitudinal centerline during a frontal collision of the vehicle;

each engine cradle side rail being attached at a forward end thereof to the forward section of a respective main frame rail and attached at a rear end thereof to the vehicle at rear attachment point of the cradle disposed adjacent the rear end of the rear section of the respective main frame rail.

11. The front frame structure of claim 10 wherein at least one of the selectively crushable junctures comprises a rectangular box frame structure having one or more generally longitudinally oriented elongated stiffening ribs embossed into a wall of one surface of the rectangular box frame structure, to thereby predispose the selectively crushable juncture to bend in a preferred direction during a frontal collision of the vehicle.

12. The front frame structure of claim 11, wherein the front and rear ends of the engine cradle side rails include a front and a rear selectively crushable juncture joined by a non-deformable intermediate section, the front and rear selectively crushable junctures of each engine cradle side rail predisposing the intermediate section of the engine cradle side rail to move downward and rearward during a frontal collision of the vehicle.

13. The front frame structure of claim 12, wherein at least one of the selectively crushable junctures of the engine cradle comprises a rectangular box frame structure having a bend initiating dimple extending transversely across one surface of the rectangular box frame structure and a pair of longitudinally extending slots adjacent the bend initiating dimple in one or more of the adjoining surfaces of the rectangular box frame structure.

14. The front frame structure of claim 12, wherein one or more of the selectively crushable junctures further predisposes the forward end of at least one of the rear sections to pivot rearward during a frontal collision of the vehicle.

15. The front frame structure of claim 14, wherein one or more of the selectively crushable junctures further predisposes at least one of the second selectively crushable junctures to pivot upward during a frontal collision of the vehicle.

16. The front frame structure of claim 15, wherein one or more of the selectively crushable junctures further predisposes the front end of at least one of the rear sections to pivot rearward during a frontal collision of the vehicle.

17. The front frame structure of claim 16 wherein for each main frame rail, the front section is predisposed to deform first, the second juncture is predisposed to pivot outward and upward second, the intermediate section of the engine cradle is predisposed to move downward third, and the forward end of the rear section is predisposed to pivot rearward last, during a frontal collision of the vehicle.

18. A method for absorbing energy during a frontal collision of the vehicle, the method comprising:

constructing the vehicle to include a front frame structure having a bumper reinforcement and a pair of juxtaposed main frame rails, with the bumper reinforcement disposed at a front end of the frame structure and extending transversely to a longitudinal centerline of the vehicle and the pair of juxtaposed main frame rails extending longitudinally along the longitudinal centerline of the vehicle, each main frame rail having a front end thereof attached to the bumper reinforcement and a rear end thereof attached to a respective side rail of the vehicle, each main frame rail also having a deformable forward section, a non-deformable intermediate section and a non-deformable rear section thereof, each of the forward, intermediate and rear sections of each main frame rail defining a front and a rear end thereof, with the forward section of each main frame rail being joined at the front end thereof to the bumper reinforcement and at the rear end thereof to the front end of the intermediate section of that main frame rail, the rear section of that main frame rail being joined at the front end thereof to the rear end of the intermediate section of that main frame rail and at the rear end thereof to the respective side rail of the vehicle, with each main frame rail further including a first selectively crushable juncture joining the rear end of the forward section of that main frame rail to the front end of the intermediate section of that main frame rail, a second selectively crushable juncture joining the rear end of the intermediate section of that main frame rail to the front end of the rear section of that main frame rail, and a third selectively crushable juncture between the rear end of the rear section and the respective side rail of the vehicle; and configuring one or more of the first, second, and third selectively crushable junctures to predispose at least one of the second selectively crushable junctures to pivot outward with respect to the longitudinal centerline during a frontal collision of the vehicle.

19. The method of claim 18, further comprising, configuring one or more of the selectively crushable junctures to predispose the front end of at least one of the rear sections to pivot rearward during a frontal collision of the vehicle.

20. The method of claim 19, further comprising, configuring one or more of the selectively crushable junctures to predispose at least one of the second selectively crushable junctures to pivot upward during a frontal collision of the vehicle.

* * * * *